United States Patent
Fimoff et al.

(10) Patent No.: US 7,313,182 B2
(45) Date of Patent: Dec. 25, 2007

(54) DECISION FEEDBACK EQUALIZERS WITH CONSTRAINED FEEDBACK TAPS FOR REDUCED ERROR PROPAGATION

(75) Inventors: Mark Fimoff, Hoffman Estates, IL (US); William J. Hillery, LaFayette, IN (US); Michael D. Zoltowski, West LaFayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 734 days.

(21) Appl. No.: 10/804,706

(22) Filed: Mar. 19, 2004

(65) Prior Publication Data
US 2004/0228399 A1 Nov. 18, 2004

Related U.S. Application Data (60) Provisional application No. 60/457,141, filed on Mar. 24, 2003.

(51) Int. Cl.
*H03H 7/40* (2006.01)
(52) U.S. Cl. .................. 375/233; 375/229; 375/346
(58) Field of Classification Search ............. 375/229, 375/230, 232, 233, 259, 260, 267, 285, 316, 375/340, 343, 350, 354, 346, 348; 333/17.1, 333/18
See application file for complete search history.

(56) References Cited

U.S. PATENT DOCUMENTS

| | | | | |
|---|---|---|---|---|
| 4,422,175 A * | 12/1983 | Bingham et al. | ............ | 375/232 |
| 4,985,902 A * | 1/1991 | Gurcan | ............ | 375/233 |
| 5,513,214 A * | 4/1996 | Gozzo | ............ | 375/232 |
| 6,222,879 B1 * | 4/2001 | Cideciyan et al. | .......... | 375/233 |
| 6,381,271 B1 * | 4/2002 | Javerbring | ............ | 375/233 |
| 7,136,410 B2 * | 11/2006 | Choi et al. | ............ | 375/148 |
| 2003/0099289 A1 | 5/2003 | Birru | | |

* cited by examiner

*Primary Examiner*—Chieh M. Fan
*Assistant Examiner*—Naheed Ejaz (57) ABSTRACT

Constrained tap weights of a decision feedback equalizer are determined according to the channel impulse response of a channel and a constraint function. The constraint function is differentiable and is an approximation of a non-differentiable tap weight constraint function. The tap weight constraint function may have a constraint value M that is a function of a mean squared error of the estimated mean squared error at the output of the decision feedback equalizer.

29 Claims, 2 Drawing Sheets

Figure 6

DECISION FEEDBACK EQUALIZERS WITH CONSTRAINED FEEDBACK TAPS FOR REDUCED ERROR PROPAGATION

RELATED APPLICATIONS

This application claims the benefit of U.S. Provisional Application 60/457,141 filed in Mar. 24, 2003.

TECHNICAL FIELD OF THE INVENTION

The present invention relates to decision feedback equalizers having constrained taps.

BACKGROUND OF THE INVENTION

The presence of multipath interference in a broadcast channel, such as a broadcast television channel, has been a persistent obstacle to good reception by a receiver. The broadcast television channel is a relatively severe multipath environment due to a variety of conditions that are encountered in the channel and at the receiver. Channels are characterized by channel impulse responses which may be several hundreds of symbols long, so that strong interfering signals may arrive at the receiver both before and after the largest amplitude signal. In addition, the signal transmitted through the channel is subject to time varying channel conditions due to the movement of the transmitter and/or due to signal reflectors, airplane flutter, and, for indoor reception, people walking around the room. If mobile reception is desired, movement of the receiver must also be considered. As is known, intersymbol interference (ISI) is also an obstacle to good reception.

Multipath and intersymbol interference adversely affects the ability of the receiver to correctly receive the symbols transmitted by the transmitter. Therefore, equalizers are used in receivers in order to cancel the effects of multipath and intersymbol interference and thereby improve signal reception.

A decision feedback equalizer (DFE) is an attractive type of equalizer because it theoretically performs better than a linear equalizer. The decision feedback equalizer typically includes a feed forward filter that includes a plurality of feed forward taps, a feedback filter that includes a plurality of feedback taps, some type of decision device such as a slicer or trellis decoder, a summer, and a tap weight calculator that sets the tap weights for the feed forward filter and the feedback filter.

The received signal is provided to the feed forward filter. The outputs of the feed forward filter and the feedback filter are summed by the summer. The output of the summer forms the output of the decision feedback equalizer. The decision device decides correct values for the output symbols of the summer and feeds these decisions to the feedback filter. The tap weight calculator estimates the channel impulse response based on the received signal and the decisions from the decision device. The tap weight calculator then determines the optimal (MMSE—minimum mean squared error) tap weights based on this channel impulse response estimate and the estimated signal-to-noise ratio that characterizes the received signal, and adjusts the feed forward taps of the feed forward filter and the feedback taps of the feedback filter according to these tap weights.

If the tap weights of the feedback filter of the decision feedback equalizer are relatively large, and if the decision device of the decision feedback equalizer makes an error, a problem known as error propagation may arise. Error propagation can significantly reduce the performance of a decision feedback equalizer. In cases of severe intersymbol interference (ISI), this reduction in performance can be so large that steps must be taken to mitigate the error propagation.

In order to reduce error propagation, it is known to calculate the MMSE tap weights for the decision feedback equalizer subject to a constraint on the tap weights of the feedback filter, thereby limiting the tap weights of the taps of the feedback filter to values that reduce error propagation. In order to calculate such constraint limited tap weights, it is typically necessary to differentiate the constraining function. However, certain desirable constraint functions, such as the 1-norm (that maintains the sum of the absolute values of the feedback tap weights below a selected value) are not differentiable and, therefore, cannot be used for this purpose.

The present invention overcomes one or more of these or other problems.

SUMMARY OF THE INVENTION

According to one aspect of the present invention, a method of supplying tap weights to taps of a decision feedback equalizer comprises the following:
determining a channel impulse response of a channel through which the decision feedback equalizer receives a signal; determining constrained tap weights based on the channel impulse response and a differentiable tap weight constraint function, wherein the differentiable tap weight constraint function is an approximation of a non-differentiable tap weight constraint function; and, supplying the constrained tap weights to the decision feedback equalizer.

According to another aspect of the present invention, a decision feedback equalizer comprises a feed forward filter, a decision device, a feedback filter, a summer, and a tap weight determiner. The feed forward filter applies feed forward taps to a signal to be equalized. The feedback filter applies feedback taps to an output of the decision device. The summer sums outputs from the feed forward filter and the feedback filter to provide the output of the decision feedback equalizer, and the output of the decision feedback equalizer is provided to the decision device. The tap weight determiner determines constrained tap weights and unconstrained tap weights based on a minimum mean squared error between the signal to be equalized and the output of the decision device. The constrained tap weights are determined by constraining the minimum mean squared error according to a tap weight constraint function, and the tap weight constraint function is differentiable and is an approximation of a non-differentiable tap weight constraint function. The tap determiner supplies the constrained tap weights to the taps of the feedback filter and the unconstrained tap weights to the taps of the feed forward filter.

According to still another aspect of the present invention, a method of supplying tap weights to taps of a decision feedback equalizer comprises the following: determining a channel impulse response of a channel through which the decision feedback equalizer receives a signal; determining a constraint value M as a function of an output of the decision feedback equalizer; determining constrained tap weights based on the channel impulse response and a tap weight constraint function having the constraint value M; and, supplying the constrained tap weights to the decision feedback equalizer.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
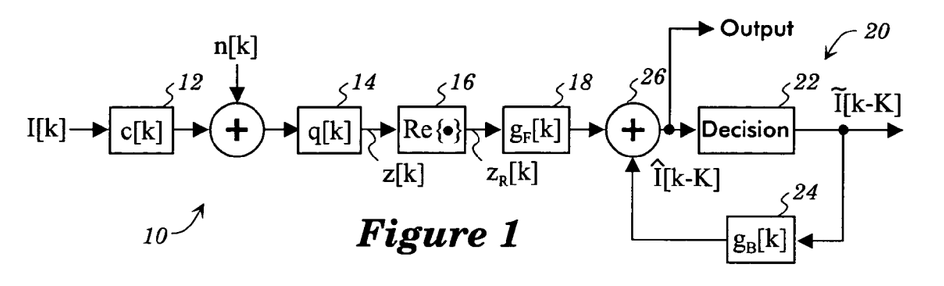
FIG. 1 shows a baseband equivalent discrete-time equalizer system useful in describing the present invention.

A baseband equivalent discrete-time equalizer system 10 is shown in FIG. 1. The sequence I[k] represents the transmitted symbols which are assumed to be independent and equally probable with zero mean and a variance $\xi_I=E\{|I[k]|^2\}$, where E is the expectation operator. For 8-VSB such as used in digital television according to the 1996 ATSC digital television (DTV) standard, the transmitted symbols are taken from the set A={±1, ±3, ±5, ±7}.

In continuous time, the symbols I[k] are transmitted through the multipath channel 12. The multipath channel 12 is denoted c[k] and contains M paths with delays $\tau_i$ and complex gains $\alpha_i$. Including the effect of pulse shaping at the transmitter, the channel impulse response of the channel 12 is given by the following equation:

$$c(t) = \sum_{i=1}^{M} \alpha_i q(t - \tau_i). \quad (1)$$

The path considered to be the "main" path is always assigned a delay $\tau$ of zero. In an ATSC 8-VSB system, the transmitted pulse q(t) has a square-root raised cosine spectrum with a nominal bandwidth of one-half the symbol rate, but is shifted up in frequency by one-fourth the symbol rate. Therefore, the transmitted pulse shape q(t) is complex.

The discrete-time channel c[k] is found by sampling c(t) at the symbol rate. A pulse shaping filter 14 at the receiver is denoted q[k] and is obtained by sampling q(t) at the symbol rate. Because q*(−t)=q(t), the pulse shaping filter 14 is matched to the transmitter filter (where * denotes complex conjugation). It is assumed that q[k] has finite length and is given in vector form by $q=[q[-L_q] \ldots q[0] \ldots q[L_q]]^T$. The composite channel is a combination of the channel and the pulse shaping and is defined as h[k]=c[k]*q[k] (where * indicates convolution). It is assumed that the composite channel also has a finite length and is given in vector form by $h=[h[-L_{ha}] \ldots h[L_{hc}]]^T$. The length of the composite channel is $L_h+1$, where $L_h=L_{ha}+L_{hc}$, where $L_{ha}$ is the number of taps prior to the main path, and where $L_{hc}$ is the number of taps after the main path. The noise sequence η[k] is introduced as shown in FIG. 1 and is complex additive white Gaussian noise (AWGN) with a power spectral density of $N_0$.

The received signal z[k] is given by the following equation:

$$z[k]=h[k]*I[k]+v[k], \quad (2)$$

where v[k]=η[k]*q[k] is colored complex noise. For ease of explanation, it is assumed that the equalizer is a real equalizer so that the real part of the signal is taken prior to a feedforward filter 18 of a decision feedback equalizer 20. A subscript R is used herein to indicate the real part of a given quantity. Therefore, the input signal to the decision feedback equalizer 20 may be written according to the following equation:

$$z_R[k]=Re\{z[k]\}=h_R[k]*I[k]+v_R[k], \quad (3)$$

where $h_R[k]=Re\{h[k]\}$ and $v_R[k]=Re\{v[k]\}$. Because the feed forward filter 18 of the decision feedback equalizer 20 contains $(N_{FF}+1)$ taps, $(N_{FF}+1)$ consecutive samples of $z_R(k)$ are assembled into a vector according to the following equation:

$$z_R[k]=H_R I[k]+v_R[k] \quad (4)$$

where $z_R[k]=[z_R[k] \ldots z_R[k-N_{FF}]]^T$ is the vector at the input of the decision feedback equalizer 20, $I[k]=[I[k+L_{ha}] \ldots I[k-L_{hc}-N_{FF}]]^T$ is a vector of transmitted symbols, and $v_R[k]=[v_R[k] \ldots v_R[k-N_{FF}]]^T$ is the real part of the colored complex noise. It is known that $v_R[k]$ is white. The channel matrix may be given by the following equation:

$$H_R = \begin{bmatrix} h_R^T & 0 & \cdots & 0 \\ 0 & h_R^T & \cdots & 0 \\ \vdots & \vdots & \ddots & \vdots \\ 0 & 0 & \cdots & h_R^T \end{bmatrix}. \quad (5)$$

The colored complex noise vector is given by the following equation:

$$v[k]=Q\eta[k] \quad (6)$$

where $\eta[k]=[\eta[k+L_q] \ldots \eta[k-L_q-N_{FF}]]^T$ and Q is given by the following equation:

$$Q = \begin{bmatrix} q^T & 0 & \cdots & 0 \\ 0 & q^T & \cdots & 0 \\ \vdots & \vdots & \ddots & \vdots \\ 0 & 0 & \cdots & q^T \end{bmatrix} \quad (7)$$

The remainder of the decision feedback equalizer 20 includes a decision device 22, a feedback filter 24, and a summer 26. The summer 26 adds the output of the feed forward filter 18 and the output of the feedback filter 24, and the decision device 22 processes the output of the summer 26 by determining correct values for the symbols at the output of the summer 26. The feed forward filter 18 applies feed forward taps to z[k]. The feedback filter 24 applies feedback taps to the symbol decisions from the decision device 24. The output of the summer 26 is the output of the decision feedback equalizer 20.

The feed forward filter 18 has $(N_{FF}+1)$ taps and the feedback filter 24 has $N_{FB}$ taps. The coefficient vectors for the feed forward filter 18 and the feedback filter 24 are $g_F=[g_F[0] \ldots g_F[N_{FF}]]^T$ and $g_B=[g_B[1] \ldots g_B[N_{FB}]]^T$, respectively. At the output of the decision feedback equalizer 20, the symbol estimate is given by the following equation:

$$\tilde{I}[k-K] = g_F^T z_R[k] + g_B^T \tilde{I}[k-K-1], \quad (8)$$

where $\tilde{I}[k] = [\tilde{I}[k] \ldots \tilde{I}[k+1-N_{FB}]]^T$ are the decisions from $N_{FB}$ previous symbols. It is noted that $\tilde{I}[k] \in A$. The integer K is defined to be the cursor, which identifies the symbol being estimated in $I[k]$. The decision device 22 may be either a standard 8-level slicer (quantizer) or a trellis decoder as described herein.

The following equations may be assumed:

$$R_{z_R z_R} = H_R H_R^T + \frac{N_0}{\xi_I} I_{N_{FF}+1} \quad (10)$$

$$R_{x_R I_B} = H_R \Delta_K \quad (11)$$

$$r_{I z_R} = H_R \delta_{K+L_{ha}} \quad (12)$$

where $$\frac{N_0}{\xi_I}$$

is the inverse of the signal-to-noise ratio. The vector $\delta_n$ contains all zeros except for a one in component n+1. When $N_{FB} \leq L_{hc} + N_{FF} - K$, then $$\Delta_K = \begin{bmatrix} 0_{(L_{ha}+K+1) \times N_{FB}} \\ I_{N_{FB}} \\ 0_{(N_{FF}+L_{hc}-K-N_{FB}) \times N_{FB}} \end{bmatrix}. \quad (13)$$

In this system of equations, $O_{m \times n}$ is a zero matrix with m rows and n columns, and $I_n$ is the identity matrix.

The mean square error (MSE) at the equalizer output is given by the following equation:

$$MSE(g_F, g_B) = E[(I[k-K] - \tilde{I}[k-K])^2] \quad (14)$$
$$= \xi_I - 2 g_F^T r_{I z_R} + 2 g_F^T R_{z_R I_B} g_B +$$
$$g_F^T R_{z_R z_R} g_F + \xi_I g_B^T g_B$$

where E is the expectation operator. The minimum mean square error decision feedback equalizer tap weights ($g_F, g_B$) are calculated by differentiating equation (14) with respect to $g_F$ and $g_B$, setting the respective derivatives equal to zero, and then simultaneously solving the two equations for $g_F$ and $g_B$. This method is well known.

In considering error propagation, the error at the output of the decision feedback equalizer 20 is given by $e[k] = \tilde{I}[k] - I[k]$. Substituting equations (4) and (8) into $e[k]$ yields the following equation:

$$e[k] = g_F^T H_R I[k+K] + g_F^T v_R[k+K] + g_B^T \tilde{I}[k-1] - I[k] \quad (15)$$

The channel matrix can be partitioned in accordance with the following equation:

$$H_R = [H_{RF} h_R^{(rt)} H_{RP1} H_{RP2}] \quad (16)$$

where $H_{RF}$ has K columns, $h_R^{(rt)}$ is a single column (and is a time-reversed and possibly truncated channel vector), $H_{RP1}$ has $N_{FB}$ columns, and $H_{RP2}$ has $L_h + N_{FF} - K - N_{FB}$ columns. Also, $I[k+K]$ can be similarly partitioned according to the following equation:

$$I[k+K] = [I_F[k]^T I[k] I_{P1}[k]^T I_{P2}[k]^T] \quad (17)$$

where similarly $I_F^T$ has K columns, $I^T$ is a single column, $I_{P1}^T$ has $N_{FB}$ columns, and $I_{P2}^T$ has $L_h + N_{FF} - K - N_{FB}$ columns. According to equations (15)-(17), the equalizer error may be given by the following equation:

$$e[k] = g_F^T H_{RF} I_F[k] + (g_F^T h_R^{(rt)} - 1) I[k] + \quad (18)$$
$$g_F^T H_{RP1} I_{P1}[k] + g_F^T H_{RP2} I_{P2}[k] + g_F^T v_R[k] + g_B^T \tilde{I}[k-1].$$

Because $R_{z_R I_B} = H_{RP1}$ and $r_{I z_R} = h_R^{(rt)}$, the following equation is obtained:

$$g_B = -H_{RP1}^T g_F \quad (19)$$

(the feedback filter taps $g_B$ results from a convolution of the channel and the feed forward filter taps $g_F$) and the equalizer error is now given by the following equation:

$$e[k] = g_B^T(\tilde{I}[k-1] - I_{P1}[k]) + (g_F^T h_R^{(rt)} - 1) I[k] + \quad (20)$$
$$g_F^T H_{RF} I_F[k] + g_F^T H_{RP2} I_{P2}[k] + g_F^T v_R[k]$$

The first term of equation (20) is due to decision errors, the second term of equation (20) is due to equalizer bias, the third and fourth terms of equation (20) are residual intersymbol interference (ISI), and the last term of equation (20) originates from the noise.

Equation (20) demonstrates how error propagation occurs in the unconstrained equalizer. If a single nearest-neighbor decision error (magnitude 2) exists in $\tilde{I}[k-1]$, and when that error reaches the position of the maximum magnitude feedback tap $g_{B_{max}}$, the contribution to the error $e[k]$ is $2g_{B_{max}}$. If $g_{B_{max}} > \frac{1}{2}$, and if $I[k]$ is not $\pm 7$, the decision error contribution to the symbol estimate pushes the symbol estimate across the decision threshold, and an additional error is likely. When $I[k]$ is $\pm 7$, the decision error must have the right polarity to push the symbol estimate across the decision boundary. When each additional error reaches the same feedback tap, a new error is again likely, and a potentially long sequence of errors may occur.

The following analysis examines conditions under which no error propagation occurs. The following simplifying assumptions can be made: the equalizer is unbiased ($g_F^T h_R^{(rt)} = 1$); there is negligible residual ISI $g_F^T H_{RF} I_F[k]$ and $g_F^T H_{RP2} I_{P2}[k]$ are negligible); and, there is negligible noise contribution ($g_F^T v_R[k]$ is negligible)

In other words, the focus of the analysis is placed only on the decision errors in equation (20). With the above assump tions, equation (20) can be re-written according to the following equation:

$$e[k] = g_B^T(\tilde{I}[k-1] - I_{P1}[k]) = \sum_{m=1}^{N_{FB}} g_B[m](\tilde{I}[k-1] - I[k-1]) \quad (21)$$

When using a standard slicer as the decision device 22, the probability of error is zero when $|e[k]|<1$. This condition can be assured if the following inequality is true:

$$\sum_{m=1}^{N_{FB}} |g_B[m]||\tilde{I}[k-1] - I[k-1]| < 1 \quad (22)$$

If it is also assumed that the probability of making a decision error, which is not a nearest neighbor of the correct symbol, is negligible, then all decision errors have magnitude 2. That is, $|\tilde{I}[k]-I[k]|\leq 2$ for all k. Therefore, if $$\|g_B\|_1 = \sum_{m=1}^{N_{FB}} |g_B[m]| < \frac{1}{2} \quad (23)$$

then the probability of a decision error propagating a new error (under these assumptions) is zero. $\|g_B\|_1$ is the 1-norm.

The analysis above indicates how error propagation may be eliminated if the feedback tap vector $g_B$ satisfies a constraint on its 1-norm $\|g_B\|_1$. The discussion below describes how to calculate new equalizer coefficients by directly constraining the 1-norm of the feedback tap vector. The equalizer coefficients are calculated by solving the following minimization problem:

minimize $MSE(g_F, g_B)$ (24a)

subject to $\|g_F\|_1 < M$ (24b)

where M is the constraint value and the norm is the 1-norm. The minimization is performed over both $g_F$ and $g_B$.

When calculating tap weights that minimize the mean squared error MSE subject to an inequality constraint such as equation (24b), the following Lagrangian function can be used:

$$L(g_F, g_B, \lambda) = MSE(g_F, g_B) + 2\lambda(\|g_B\|_1 - M), \quad \lambda \geq 0$$
$$= MSE(g_F, g_B) + 2\lambda\left(\sum_{m=1}^{N_{FB}} |g_B[m]| - M\right), \quad \lambda \geq 0$$

Then, this expression is differentiated with respect to $g_F$, $g_B$, and $\lambda$, the three derivatives are each set equal to zero, and the three equations are solved simultaneously for $g_F$, $g_B$, and $\lambda$. Iterative methods for solving this system of equations are well known. However, for this calculation of tap weights by minimizing the mean squared error MSE subject to the inequality constraint of equation (24b) to work, the inequality constraint function must be differentiable (i.e., its gradient must exist).

However, the drawback in using the 1-norm as a constraint is that its gradient does not exist when any feedback tap is zero. To avoid this situation, the constraint is modified as indicated below so that an analytical gradient exists at all points. The modified constraint is given by the following inequality:

$$\sum_{m=1}^{N_{FB}} f(g_B[m]) \leq M \quad (25)$$

where the function f(x) is given by the following equation:

$$f(x) = \begin{cases} |x| & \text{if } |x| \geq \gamma \\ f_0 + f_2 x^2 + f_4 x^4 & \text{if } |x| < \gamma \end{cases} \quad (26)$$

The three constants $f_0$, $f_2$, and $f_4$ are chosen so that f(x) is continuously differentiable. Under these conditions, $f_0$ is arbitrarily chosen to yield a desired value of f(x) at x=0 between 0 and $\gamma/2$, inclusive. The constants $f_2$ and $f_4$ are given by the following equations:

$$f_2 = \frac{3}{2\gamma} - 2\frac{f_0}{\gamma^2} \quad (27)$$

$$f_4 = \frac{1}{\gamma^4}\left(f_0 - \frac{\gamma}{2}\right) \quad (28)$$

This modified constraint function is an approximation to the 1-norm constraint function and is equal to the 1-norm constraint function over most of the range of possible values of $g_B[m]$. The region where this modified constraint function differs from the 1-norm constraint function is in the neighborhood of points close to where the 1-norm constraint function is not differentiable.

Figure 2:
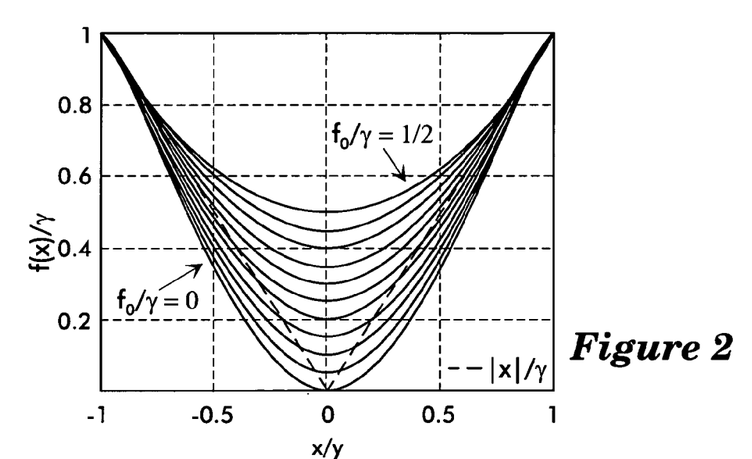
FIG. 2 is a graph illustrating differences between several modified constraints on tap weight values for the feedback taps of a decision feedback equalizer and the unmodified constraint.

The difference between this modified constraint function and the 1-norm constraint function depends on the choice of $f_0$ and $\gamma$. This difference is shown in FIG. 2 where $f(x)/\gamma$ is compared to $|x|/\lambda$ as $f_0/\gamma$ is stepped from zero to ½ in increments of 0.05. The dashed line in FIG. 2 represents the unmodified constraint function and the solid lines in FIG. 2 represent modified constraint function for various values of the ratio $f_0/\gamma$.

The Lagrangian function is modified in accordance with this constraint to produce the following equation:

$$L(g_F, g_B, \lambda) = MSE(g_F, g_B) + 2\lambda(\|g_B\|_1 - M), \quad \lambda \geq 0$$
$$\cong MSE(g_F, g_B) + 2\lambda\left(\sum_{m=1}^{N_{FB}} f(g_B[m]) - M\right), \quad \lambda \geq 0$$

where $f(g_B[m])$ is specified in accordance with equations (26)-(28) and the constraint function M is set as described above. Typical useful values of M are 1, 2, or 3. A typical useful values of $\gamma$ is M/1000. A typical value for $f_0$ is $3\gamma/8$. Typical values for $f_2$ and $f_4$ are then given by equations (27) and (28).

Figure 3:
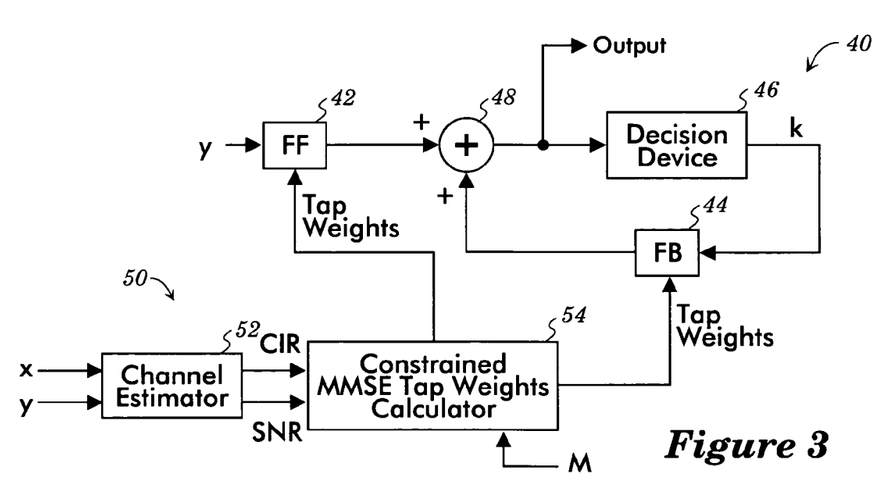
FIG. 3 illustrates a decision feedback equalizer according to the present invention.

A decision feedback equalizer 40 that implements the present invention is shown in FIG. 3. The decision feedback equalizer 40 includes a feed forward filter 42 that includes a plurality of feed forward taps, a feedback filter 44 that includes a plurality of feedback taps, a decision device 46 such as a slicer or trellis decoder, a summer 48, and a tap weight calculator 50 that sets the tap weights for the feed forward filter 42 and the feedback filter 44.

The tap weight calculator includes a channel estimator 52 that estimates the channel impulse of the channel through which a signal y is received by the decision feedback equalizer 40. The feed forward filter applies the feed forward taps $g_F$ to the received signal y. The outputs of the feed forward filter 42 and the feedback filter 44 are summed by the summer 48. The output of the summer 48 forms the output of the decision feedback equalizer 40. The decision device 46 makes symbol decisions x for the output of the summer 48 and feeds these symbol decisions x to the feedback filter 44 which applies the feedback taps $g_B$ to these symbol decisions x.

The channel estimator 52 estimates the channel impulse response CIR and the signal-to-noise ratio SNR in known fashion based on the received signal y and the symbol decisions x from the decision device 46. A tap weight determiner 54 determines the feed forward tap weights $g_F$ and the feedback tap weights $g_B$ from the channel estimate and the SNR estimate based on the equations and procedures discussed above. The tap weight determiner 54 supplies the feed forward tap weights $g_F$ to the feedforward filter 42 and the feedback tap weights $g_B$ to the feedback filter 44 for application to the received signal y and the symbol decisions x, respectively.

The unconstrained decision feedback equalizer in theory provides the lowest mean squared error at the output of the decision feedback equalizer, as long as there is no error propagation. The constrained decision feedback equalizer results in a larger mean squared error at the output of the decision feedback equalizer, but reduces the chance of error propagation.

For the constrained decision feedback equalizer, as the constraint value M increases, the mean squared error is lowered, but the effectiveness of the constraint is reduced. As the constraint value M approaches infinity, the decision feedback equalizer effectively becomes unconstrained. As the constraint value M is reduced, the chance of error propagation is reduced but the mean squared error at the output of the decision feedback equalizer is increased. If the constraint value M is too small, then the mean squared error will become too large. In that case, the constraint will actually cause error propagation. So, the constraint value M needs to be confined within a useful range.

Figure 4:
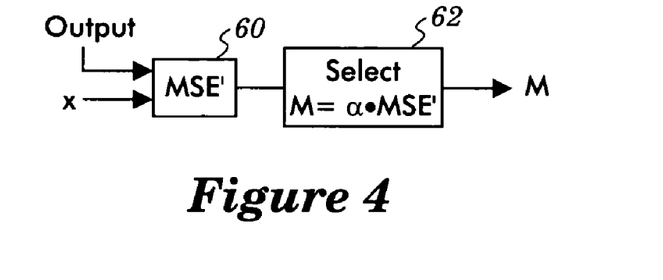
FIG. 4 shows an apparatus for adaptively determining the constraint value M.
Figure 5:
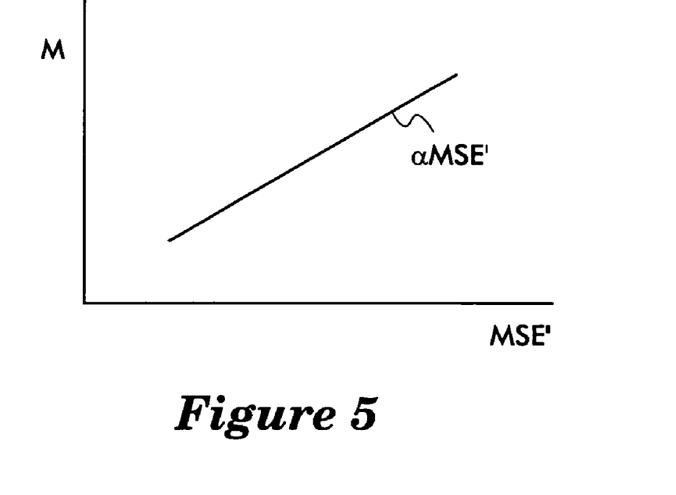
FIG. 5 is a graph that illustrates the adaptation of the constraint value M as a function of the mean squared error at the output of the decision feedback equalizer; and, FIG. 6 is a graph that illustrates an alternative adaptation of the constraint value M as a function of the mean squared error at the output of the decision feedback equalizer.

Moreover, the constraint value M may be adjusted adaptively by an arrangement shown in FIG. 4. As shown in FIG. 4, a block 60 provides an estimate of the mean squared error MSE (hereinafter MSE') at the output of the decision feedback equalizer 46 from L samples as given by the following equation:

$$MSE' = \frac{1}{L}\sum_{n=1}^{L} |a_n - b_n|^2$$

where a is the output of the decision feedback equalizer 40 (the output at the summer 48) and b is the output of the decision device 46. A block 62 then determines the constraint value M according to the following equation:

M=αMSE' where α is a desired proportionality constant. Thus, as shown in FIG. 5, the constraint value M is proportionally increased as the estimated mean squared error MSE' increases because increasing the constraint value M will tend to reduce the mean squared error MSE. This upward adjustment of the constraint value M will prevent the constraint value M from becoming too small. On the other hand, as also shown in FIG. 5, when the estimated mean squared error MSE' is very low, the constraint value M is proportionally decreased. This downward adjustment of the constraint value M will increase the mean squared error MSE somewhat, but will further reduce the chance of error propagation.

Figure 6:
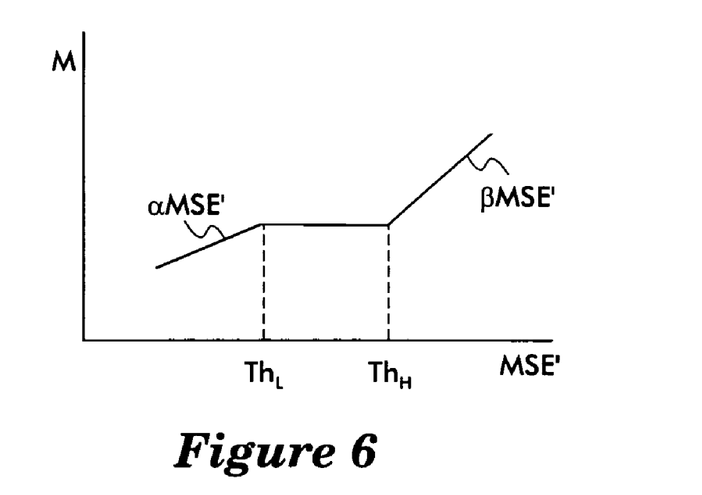

The block 62 can also adjust the constraint value M according to the function shown in FIG. 6. Accordingly, if the estimated mean squared error MSE' is less than or equal to a low threshold $Th_L$, the constraint value M is given as M=α MSE'. However, if the estimated mean squared error MSE' is greater than or equal to a high threshold $Th_H$, the constraint value M is given as M=β MSE'. If the estimated mean squared error MSE' is between $Th_L$ and $Th_H$, the constraint value M is not changed. Thus, there is a deadband between $Th_L$ and $Th_H$. The proportionality constants α and β may have any desired value and may be equal or not as desired.

Certain modifications of the present invention have been discussed above. Other modifications will occur to those practicing in the art of the present invention. For example, the present invention has been particularly described above for 8 VSB digital television systems. However, the present invention is applicable to other types of systems and to other modulation techniques such as quadrature amplitude modulation (QAM).

Moreover, FIG. 5 illustrates that the constraint value M is a linear function of the mean squared error MSE, and FIG. 6 illustrates that the constraint value M is a first linear function of the mean squared error MSE below the threshold $Th_L$ and is a second linear function of the mean squared error MSE above the threshold $Th_H$. However, functions other than linear functions can be used to adapt the constraint value M.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of supplying tap weights to taps of a decision feedback equalizer comprising:
   determining a channel impulse response of a channel through which the decision feedback equalizer receives a signal;
   determining constrained tap weights based on the channel impulse response and a differentiable tap weight constraint function, wherein the differentiable tap weight constraint function is an approximation of a non-differentiable tap weight constraint function; and,
   supplying the constrained tap weights to the decision feedback equalizer.

2. The method of claim 1 wherein the differentiable tap weight constraint function comprises an approximation of a 1-norm tap weight constraint function.

3. The method of claim 1 wherein the decision feedback equalizer comprises a feed forward filter having feed forward taps and a feedback filter having feedback taps, wherein the determining of constrained tap weights comprises (i) determining constrained tap weights for the taps of the feedback filter based on the differentiable tap weight constraint function and (ii) determining unconstrained tap weights for the taps of the feed forward filter, and wherein the supplying of the constrained tap weights to the decision feedback equalizer comprises (i) supplying the constrained tap weights to the feedback filter and (ii) supplying the unconstrained tap weights to the feed forward filter.

4. The method of claim 3 wherein the differentiable tap weight constraint function comprises an approximation of a 1-norm tap weight constraint function, and wherein the differentiable tap weight constraint function comprises a function of the feedback taps.

5. The method of claim 1 wherein the determining of a channel impulse response comprises determining the channel impulse response and a signal-to-noise ratio characterizing the channel, and wherein determining of constrained tap weights comprises determining the constrained tap weights based on the channel impulse response, the signal-to-noise ratio, and the differentiable tap weight constraint function.

6. The method of claim 5 wherein the differentiable tap weight constraint function comprises an approximation of a 1-norm tap weight constraint function.

7. The method of claim 5 wherein the decision feedback equalizer comprises a feed forward filter having feed forward taps and a feedback filter having feedback taps, wherein the determining of constrained tap weights comprises (i) determining constrained tap weights for the taps of the feedback filter based on the differentiable tap weight constraint function and (ii) determining unconstrained tap weights for the taps of the feed forward filter, and wherein the supplying of the constrained tap weights to the decision feedback equalizer comprises (i) supplying the constrained tap weights to the feedback filter and (ii) supplying the unconstrained tap weights to the feed forward filter.

8. The method of claim 7 wherein the modified tap weight constraint function comprises a 1-norm tap weight constraint function, and wherein the differentiable tap weight constraint function comprises a function of the feedback taps.

9. The method of claim 1 wherein the differentiable tap weight constraint function is given by the following expression:

$$\sum_{m=0}^{N_{FB}} f(g[m]) \le M$$

wherein f(g[m]) is given by the following expression:

$$f(x) = \begin{cases} |x| & \text{if } |x| \ge \gamma \\ f_0 + f_2 x^2 + f_4 x^4 & \text{if } |x| < \gamma \end{cases}$$

wherein x=g[m], wherein g[m] are the tap weights, wherein $N_{FB}$ are the number of the taps, and wherein $\gamma$, M, $f_0$, $f_2$, and $f_4$ are selected values.

10. The method of claim 9 wherein M=1, 2, or 3, $\gamma$=M/1000, $f_0$=3$\gamma$/8, and wherein $f_2$ and $f_4$ are determined in accordance with the following expressions:

$$f_2 = \frac{3}{2\gamma} - 2\frac{f_0}{\gamma^2}$$

$$f_4 = \frac{1}{\gamma^4}(f_0 - \frac{\gamma}{2}).$$

11. The method of claim 1 wherein the decision feedback equalizer comprises a feed forward filter having feed forward taps and a feedback filter having feedback taps, wherein the differentiable tap weight constraint function is given by the following expression:

$$\sum_{m=0}^{N_{FB}} f(g_B[m]) \le M$$

wherein f($g_B$[m]) is given by the following expression:

$$f(x) = \begin{cases} |x| & \text{if } |x| \ge \gamma \\ f_0 + f_2 x^2 + f_4 x^4 & \text{if } |x| < \gamma \end{cases}$$

wherein x=$g_B$[m], wherein $g_B$[m] are the tap weights of the feedback taps, wherein $N_{FB}$ are the number of the feedback taps, and wherein $\gamma$, M, $f_0$, $f_2$, and $f_4$ are selected values.

12. The method of claim 11 wherein M=1, 2, or 3, $\gamma$=M/1000, $f_0$=3$\gamma$/8, and wherein $f_2$ and $f_4$ are determined in accordance with the following expressions:

$$f_2 = \frac{3}{2\gamma} - 2\frac{f_0}{\gamma^2}$$

$$f_4 = \frac{1}{\gamma^4}(f_0 - \frac{\gamma}{2}).$$

13. A decision feedback equalizer comprising:
a feed forward filter that applies feed forward taps to a signal to be equalized, wherein the signal to be equalized is based on transmitted symbols;
a decision device;
a feedback filter that applies feedback taps to an output of the decision device;
a summer that sums outputs from the feed forward filter and the feedback filter to provide the output of the decision feedback equalizer, wherein the output of the decision feedback equalizer is provided to the decision device; and,
a tap weight determiner that determines constrained tap weights and unconstrained tap weights in response to the output of the decision device and the signal to be equalized in order to minimize the mean squared error between the transmitted symbols and the output of the decision feedback equalizer, wherein the constrained tap weights are constrained according to a tap weight constraint function, wherein the tap weight constraint function is differentiable and is an approximation of a non-differentiable tap weight constraint function, and wherein the tap determiner supplies the constrained tap weights to the taps of the feedback filter and the unconstrained tap weights to the taps of the feed forward filter.

14. The decision feedback equalizer of claim 13 wherein the tap weight constraint function comprises an approximation of a 1-norm tap weight constraint function of the feedback taps.

15. The decision feedback equalizer of claim 13 wherein the tap weight constraint function is given by the following expression:

$$\sum_{m=0}^{N_{FB}} f(g_B[m]) \leq M$$

wherein $f(g_B[m])$ is given by the following expression:

$$f(x) = \begin{cases} |x| & \text{if } |x| \geq \gamma \\ f_0 + f_2 x^2 + f_4 x^4 & \text{if } |x| < \gamma \end{cases}$$

wherein $x = g_B[m]$, wherein $g_B[m]$ are the tap weights of the feedback taps, wherein $N_{FB}$ are the number of the feedback taps, and wherein $\gamma$, $M$, $f_0$, $f_2$, and $f_4$ are selected values.

16. The decision feedback equalizer of claim 15 wherein $M=1$, 2, or 3, $\gamma=M/1000$, $f_0=3\gamma/8$, and wherein $f_2$ and $f_4$ are determined in accordance with the following expressions:

$$f_2 = \frac{3}{2\gamma} - 2\frac{f_0}{\gamma^2}$$

$$f_4 = \frac{1}{\gamma^4}\left(f_0 - \frac{\gamma}{2}\right).$$

17. The decision feedback equalizer of claim 13 wherein the tap weight determiner includes a channel impulse response estimator and a tap weight calculator, wherein the channel impulse response estimator determines a channel impulse response for a channel through which the signal is received, wherein the tap weight calculator determines the constrained tap weights and the unconstrained tap weights in response to the output of the decision device and the signal to be equalized in order to minimize the mean squared error between the transmitted symbols and the output of the decision feedback equalizer.

18. The decision feedback equalizer of claim 17 wherein the tap weight constraint function comprises an approximation of a 1-norm tap weight constraint function of the feedback taps.

19. The decision feedback equalizer of claim 17 wherein the tap weight constraint function is given by the following expression:

$$\sum_{m=0}^{N_{FB}} f(g_B[m]) \leq M$$

wherein $f(g_B[m])$ is given by the following expression:

$$f(x) = \begin{cases} |x| & \text{if } |x| \geq \gamma \\ f_0 + f_2 x^2 + f_4 x^4 & \text{if } |x| < \gamma \end{cases}$$

wherein $x = g_B[m]$, wherein $g_B[m]$ are the tap weights of the feedback taps, wherein $N_{FB}$ are the number of the feedback taps, and wherein $\gamma$, $M$, $f_0$, $f_2$, and $f_4$ are selected values.

20. The decision feedback equalizer of claim 19 wherein $M=1$, 2, or 3, $\gamma=M/1000$, $f_0=3\gamma/8$, and wherein $f_2$ and $f_4$ are determined in accordance with the following expressions:

$$f_2 = \frac{3}{2\gamma} - 2\frac{f_0}{\gamma^2}$$

$$f_4 = \frac{1}{\gamma^4}\left(f_0 - \frac{\gamma}{2}\right).$$

21. A method of supplying tap weights to taps of a decision feedback equalizer comprising:
determining a channel impulse response of a channel through which the decision feedback equalizer receives a signal;
estimating an error at the output of the decision feedback equalizer;
determining a constraint value M as a function of the estimated error;
determining constrained tap weights based on the channel impulse response and a tap weight constraint function having the constraint value M; and,
supplying the constrained tap weights to the decision feedback equalizer.

22. The method of claim 21 wherein the tap weight constraint function comprises a differentiable approximation of a 1-norm tap weight constraint function.

23. The method of claim 21 wherein the decision feedback equalizer comprises a feed forward filter having feed forward taps and a feedback filter having feedback taps, wherein the determining of constrained tap weights comprises (i) determining constrained tap weights for the taps of the feedback filter based on the tap weight constraint function and (ii) determining unconstrained tap weights for the taps of the feed forward filter, and wherein the supplying of the constrained tap weights to the decision feedback equalizer comprises (i) supplying the constrained tap weights to the feedback filter and (ii) supplying the unconstrained tap weights to the feed forward filter.

24. The method of claim 23 wherein the tap weight constraint function comprises a differentiable approximation of a 1-norm tap weight constraint function of the feedback taps.

25. The method of claim 21 wherein the determining of a constraint value M as a function of an output of the decision feedback equalizer comprises determining the constraint value M as a linear function of the output of the decision feedback equalizer.

26. The method of claim 21 wherein the determining of a constraint value M as a function of an output of the decision feedback equalizer comprises determining the constraint value M as a first linear function when the mean squared error between the received signal and the output of the decision feedback equalizer is below a threshold $Th_L$ and as a second linear function when the mean squared error between the received signal and the output of the decision feedback equalizer is above a threshold $Th_H$.

27. The method of claim 26 wherein the first linear function has a proportionality constant $\alpha$, wherein the second linear function has a proportionality constant $\beta$, and wherein the proportionality constants $\alpha$ and $\beta$ are equal.

28. The method of claim 26 wherein the first linear function has a proportionality constant $\alpha$, wherein the second linear function has a proportionality constant $\beta$, and wherein the proportionality constants $\alpha$ and $\beta$ are unequal.

29. The method of claim 21 wherein the estimating of an error at the output of the decision feedback equalizer comprises estimating a mean squared error at the output of the decision feedback equalizer.

* * * * *